(12) United States Patent
Shao (10) Patent No.: US 10,939,188 B2
(45) Date of Patent: Mar. 2, 2021

(54) INTERNET OF THINGS SYSTEM USED FOR INTELLIGENT GAS METER AND INFORMATION TRANSMISSION METHOD FOR INTERNET OF THINGS SYSTEM

(71) Applicant: CHENGDU QINCHUAN IOT TECHNOLOGY CO., LTD., Sichuan (CN)

(72) Inventor: Zehua Shao, Chengdu (CN)

(73) Assignee: CHENGDU QINCHUAN IOT TECHNOLOGY CO., LTD., Sichuan (CN)

(*) Notice: Subject to any disclaimer, the term of this patent is extended or adjusted under 35 U.S.C. 154(b) by 0 days.

(21) Appl. No.: 15/776,729

(22) PCT Filed: Nov. 17, 2016

(86) PCT No.: PCT/CN2016/106244
§ 371 (c)(1),
(2) Date: May 16, 2018

(87) PCT Pub. No.: WO2017/084600
PCT Pub. Date: May 26, 2017

(65) Prior Publication Data
US 2018/0332370 A1    Nov. 15, 2018

(30) Foreign Application Priority Data
Nov. 18, 2015  (CN) .......................... 201510796810.7

(51) Int. Cl.
G08B 23/00    (2006.01)
H04Q 9/00    (2006.01)
H04L 29/08    (2006.01)

(52) U.S. Cl.
CPC .............. *H04Q 9/00* (2013.01); *H04L 67/12* (2013.01); *H04Q 2209/60* (2013.01)

(58) Field of Classification Search
CPC ....... H04L 67/12; H04Q 2209/60; H04Q 9/00
(Continued)

(56) References Cited

U.S. PATENT DOCUMENTS 9,342,288 B2 * 5/2016 Sehgal ................. G06Q 20/123
2010/0199747 A1 * 8/2010 Barna ..................... G01M 3/26
73/40.7

(Continued)

FOREIGN PATENT DOCUMENTS

CN    102769635 A    11/2012
CN    102915017 A    2/2013
(Continued)

OTHER PUBLICATIONS

International Search Report and Written Opinion from related PCT patent application No. PCT/CN2016/106244 dated Jan. 25, 2017 (9 pgs.), as well as English translation of ISR (3 pgs.); 12 pages total.

*Primary Examiner* — Naomi J Small
(74) *Attorney, Agent, or Firm* — Getech Law LLC; Jun Ye (57) ABSTRACT

Internet of things (IoT) systems for intelligent gas meters and information transmission methods for IoT systems are disclosed. The IoT system for an intelligent gas meter includes an intelligent gas meter perception and control systems, a gas network communication system, and a gas company comprehensive gas management system. The intelligent gas meter perception and control systems include an intelligent gas meter perception unit and an intelligent gas meter control unit; the gas network communication system has a perception information communication system and a control information communication system; and the gas company comprehensive gas management system has a perception information management system and a control information management system.

17 Claims, 4 Drawing Sheets

(58) Field of Classification Search
USPC .................................................. 340/870.02
See application file for complete search history.

(56) References Cited

U.S. PATENT DOCUMENTS

2013/0304264 A1* 11/2013 Shao ................... G01F 15/0755
700/282
2014/0244834 A1* 8/2014 Guedalia ................ H04W 4/08
709/224
2014/0358482 A1* 12/2014 Sehgal ................ G06F 11/3409
702/186

FOREIGN PATENT DOCUMENTS

| CN | 104038414 A | 9/2014 |
| CN | 105279934 A | 1/2016 |
| CN | 105279935 A | 1/2016 |
| CN | 105279936 A | 1/2016 |
| CN | 105279937 A | 1/2016 |
| JP | 2001274844 A | 10/2001 |

\* cited by examiner

INTERNET OF THINGS SYSTEM USED FOR INTELLIGENT GAS METER AND INFORMATION TRANSMISSION METHOD FOR INTERNET OF THINGS SYSTEM

This application is a 371 U.S. National Phase application of International PCT patent application No. PCT/CN2016/106244, filed Nov. 17, 2016, published as WO2017/084600A1 (attached hereto as an Appendix), and claims benefit/priority of Chinese patent application No. CN201510796810.7, filed Nov. 18, 2015, published as CN105279937A, all of which are incorporated herein by reference in entirety.

TECHNICAL FIELD

The present disclosure relates to the field of Internet-of-Things technologies for intelligent gas meters, and more particularly to an Internet-of-Things system for an intelligent gas meter and a related information transmission method for Internet-of-Things System.

BACKGROUND ART

Internet of Things (IOT) is a significant component of the information technology of the new generation, and also represents an important development stage in the "informatization" era. It is now generally believed that Internet of Things is an internet where objects are linked together and is an upgraded internet resulted from internet development. There are two meanings behind it. First, internet is still the core and base for Internet of Things, which is a network extended and expanded on the basis of internet. Second, the user terminal extends and expands among any objects for information exchange and communication, meaning that objects are closely related.

Currently, one of the most commonly used architectures of Internet of Things is a three-layer architecture where the Internet of Things is divided into three layers, including a perception and control layer, a network transmission layer and an application service layer.

By analysis, the inventor found that the architectures included in those reference frameworks are all based on the functions of Internet-of-Things products. Different classifications on the functions result in different structures, and for different countries, different industries and different organizations, different Internet-of-Things architectures may be provided. However, the architectures of the current Internet of Things products are essentially manifestation of functions of the Internet of Things information, and no common feature of the Internet-of-Things information system is suggested.

A patent for invention (Publication No.: CN102769635A) entitled "An Internet of Things System and Implementation Method of the Same" is published by the State Intellectual Property Office of China on Nov. 7, 2012. The disclosed Internet of Things system includes a perception and control layer, a transmission layer and an application layer. The implementation method includes the following steps: a user logging in the Internet of Things system via an Internet-of-Things browser by a user account and entering in an address bar a registered domain name of a certain perception and control component under his/her administration; a domain server parsing the above registered domain name, and the Internet-of-Things browser loading a physical page (object page) of the corresponding perception and control component; the Internet-of-Things browser loading corresponding quantum objects from a quantum piece server according to physical page elements on the corresponding physical page; the perception module timely acquiring perception information, which is sent to the Internet-of-Things browser via the transmission layer; the Internet-of-Things browser processing the perception information by the respective quantum objects; and the Internet-of-Things browser timely displaying perception information processed by the quantum objects.

Moreover, the Internet of Things currently and widely applied to the intelligent gas meter also primarily consists of a perception layer, a transmission layer and an application layer. In terms of information circulation, the information circulation paths in the existing Internet-of-Things structures are too monotonous, limited, and not secure enough. Moreover, it is impossible to manage effectively the intelligent gas meter in respective links of the information circulation, which is unfavorable for a user to timely control and manage the operation objects in a timely manner. Therefore, it is necessary to improve the existing Internet of Things system for the intelligent gas meter and the information circulation method for the Internet of Things system.

SUMMARY

In order to overcome the defects and deficiencies in the prior art mentioned above, the present disclosure provides an Internet-of-things system for an intelligent gas meter and a related information transmission method for the Internet-of-things system.

In one aspect, an Internet-of-Things system for an intelligent gas meter includes an intelligent-gas-meter perception and control system, a gas network communication system, and a gas-company comprehensive gas management system. The intelligent-gas-meter perception and control system includes an intelligent-gas-meter perception unit and an intelligent gas meter control unit. The gas network communication system includes a perception information communication system and a control information communication system. The intelligent-gas-meter perception unit in the intelligent-gas-meter perception and control system establishes communication with the gas-company comprehensive gas management system through the perception information communication system in the gas network communication system. The gas-company comprehensive gas management system establishes communication with the intelligent-gas-meter control unit in the intelligent-gas-meter perception and control system through the control information communication system in the gas network communication system.

The Internet-of-Things system for an intelligent gas meter further includes a service system. The service system establishes communication with the gas-company comprehensive gas management system through a public network. The service system includes a gas-company perception service system, a gas-company control service system, a government perception service system and a social public perception service system.

The Internet-of-Things system for an intelligent gas meter further includes a user terminal. The user terminal includes a user system.

The gas-company comprehensive gas management system includes a perception information management system and a control information management system.

The information includes perception information and control information. The control information is generated based on the perception information or obtained by converting the perception information in a process where the intelligentgas-meter perception unit transmits the perception information to the intelligent-gas-meter control unit.

In another aspect, an information transmission method for an Internet-of-Things system for an intelligent gas meter is provided. The Internet-of-Things system for the intelligent gas meter includes an intelligent-gas-meter perception and control system, a gas network communication system, and a gas-company comprehensive gas management system. The intelligent-gas-meter perception and control system includes an intelligent-gas-meter perception unit and an intelligent-gas-meter control unit. The gas network communication system includes a perception information communication system and a control information communication system. The information transmission method includes:

establishing communication between the intelligent-gas-meter perception unit and the intelligent-gas-meter control unit of the intelligent-gas-meter perception and control system, the intelligent-gas-meter perception unit perceiving the perception information of the intelligent gas meter and then transmitting the perception information to the intelligent-gas-meter control unit, the intelligent-gas-meter control unit receiving the perception information and generating control information based on the perception information or converting the perception information into control information, and implementing automatic processing of and response to the intelligent gas meter.

Preferably, the information transmission method further includes: transmitting, after the intelligent-gas-meter perception unit of the intelligent-gas-meter perception and control system perceives/senses the information of the intelligent gas meter, the perception information to the perception information management system in the gas-company comprehensive gas management system through the perception information communication system in the gas network communication system; the perception information management system transmitting the information to the control information management system; the control information management system transmitting the information to the intelligent-gas-meter control unit of the intelligent-gas-meter perception and control system through the control information communication system in the gas network communication system; and the intelligent-gas-meter control unit implementing control of the intelligent gas meter based on the received information.

Preferably, the information transmission method further includes: transmitting, after the intelligent-gas-meter perception unit of the intelligent-gas-meter perception and control system perceives the information of the intelligent gas meter, the information to the perception information management system in the gas-company comprehensive gas management system through the perception information communication system in the gas network communication system; the perception information management system transmitting the information to the gas-company perception service system in the service system through a public network; the gas-company perception service system transmitting the information to the user system of the user terminal; the user system transmitting the information to the gas-company control service system; the gas-company control service system transmitting the information to the control information management system in the gas-company comprehensive gas management system through the public network; the control information management system transmitting the information to the intelligent-gas-meter control unit of the intelligent-gas-meter perception and control system through the control information communication system in the gas network communication system; and the intelligent-gas-meter control unit implementing control of the intelligent gas meter based on the received information.

Preferably, the information includes perception information and control information. The control information is generated based on the perception information or the perception information is converted into the control information, in a process where the intelligent-gas-meter perception unit transmits the perception information to the intelligent-gas-meter control unit.

Preferably, the information transmission method further includes: the government perception service system and/or the social public perception service system in the service system acquiring public information of the intelligent gas meter through a public network, and transmitting the public information to the user system of the user terminal; the user system transmitting the public information to the gas-company control service system in the service system; the gas-company control service system transmitting the public information to the control information management system in the gas-company comprehensive gas management system through a public network; the control information management system transmitting the information to the intelligent-gas-meter control unit of the intelligent-gas-meter perception and control unit through the control information communication system in the gas network communication system; and the intelligent-gas-meter control unit implementing control of the intelligent gas meter based on the received information.

The public information includes public perception information and control information. The control information is generated based on the public perception information or the public perception information is converted into the control information, in a process where the public perception information service system transmits the information to the intelligent-gas-meter control unit.

The perception information includes at least any one or more of sensor collection information, tag information, audio information, video information, location information, and intelligent device interface information.

The public perception information also includes at least any one or more of sensor collection information, tag information, audio information, video information, location information, and intelligent device interface information.

Compared with the prior art, the present disclosure brings about the following beneficial technical effects:

1. The Internet today is essentially an electronic information transmission network. The existing Internet-of-Things related product is in the form of a product plus Internet, which is a manifestation of the Internet of Things. The Internet-of-Things system for an intelligent gas meter proposed in the present disclosure is a technical solution based on the form of the product plus Internet.

2. The inventor broke the current thought pattern restricted by the functions of the Internet-of-Things product by proposing for the first time the Internet of Things system for an intelligent gas meter, which is based on the Internet of Things. The transmission processes of perception information and the control information of the intelligent gas meter form a closed-loop system in the whole system, which makes the circulation of the perception information and the control information in the intelligent gas meter clearer, and the transmission through multiple nodes further reduces the risk of information being tampered. Moreover, the perception information and the control information of the intelligent gas meter are transmitted in opposite directions separately by two different transmission lines between the intelligent gas meter and the user system of the user terminal, avoiding mutual interference between the perception information and the control information of the intelligent gas meter during transmission. Meanwhile, the Internet-of-Things system for an intelligent gas meter provided by the present disclosure is simple in structure, has diversified transmission processes, and has more secure and reliable information transmission.

3. The Internet-of-Things system for an intelligent gas meter according to the present disclosure may further include a service system. The service system is provided for combination with the public network, so as to acquire the public information of the intelligent gas meter from the public network, and to achieve, through the service system, information opening and sharing of some information of operators in the Internet of Things, so that resources can be effectively utilized. The service system may acquire public information in the public network, and implement control of the intelligent gas meter based on the public information.

4. The Internet-of-Things system for an intelligent gas meter according to the present disclosure may further include a gas-company comprehensive gas management system, to enable a gas company to control the intelligent gas meter, and enable information interaction between the gas company and the intelligent gas meter, improving the security and reliability during information transmission.

DETAILED DESCRIPTION OF EMBODIMENTS

The specific embodiments of Internet-of-Things system for the intelligent gas meter and the information transmission method for the Internet of Things system according to the present disclosure will be described below with reference to the accompanying drawings. It should be understood that these drawings are intended to be merely illustrative, rather than being restrictive.

Figure 1:
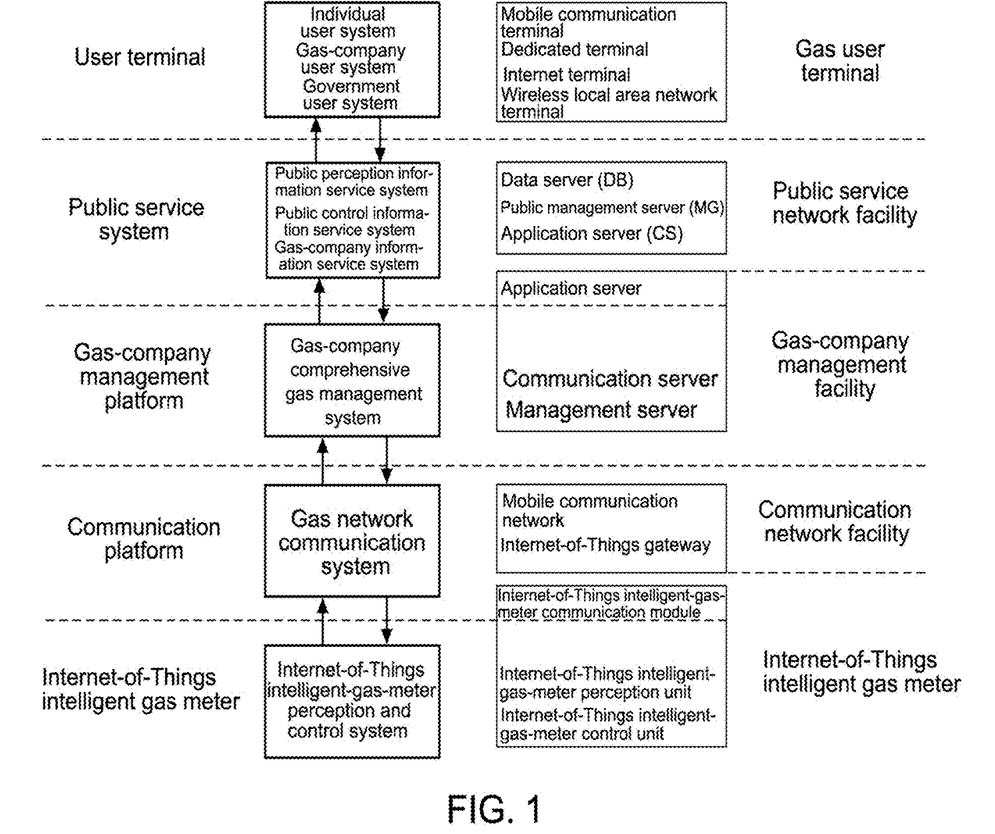
FIG. 1 is a structural diagram of an Internet-of-Things system for an intelligent gas meter according to an embodiment of the present disclosure.

FIG. 1 is a structural diagram of an Internet-of-Things system for an intelligent gas meter according to an embodiment of the present disclosure. As shown in FIG. 1, an Internet-of-Things system for an intelligent gas meter includes an intelligent-gas-meter perception and control system, a gas network communication system, and a gas-company comprehensive gas management system. The intelligent-gas-meter perception and control system includes an intelligent-gas-meter perception unit and an intelligent-gas-meter control unit. The gas network communication system comprises a perception information communication system and a control information communication system. The intelligent-gas-meter perception unit in the intelligent-gas-meter perception and control system establishes communication with the gas-company comprehensive gas management system through the perception information communication system in the gas network communication system. The gas-company comprehensive gas management system establishes communication with the intelligent-gas-meter control unit in the intelligent-gas-meter perception and control system through the control information communication system in the gas network communication system.

Figure 2:
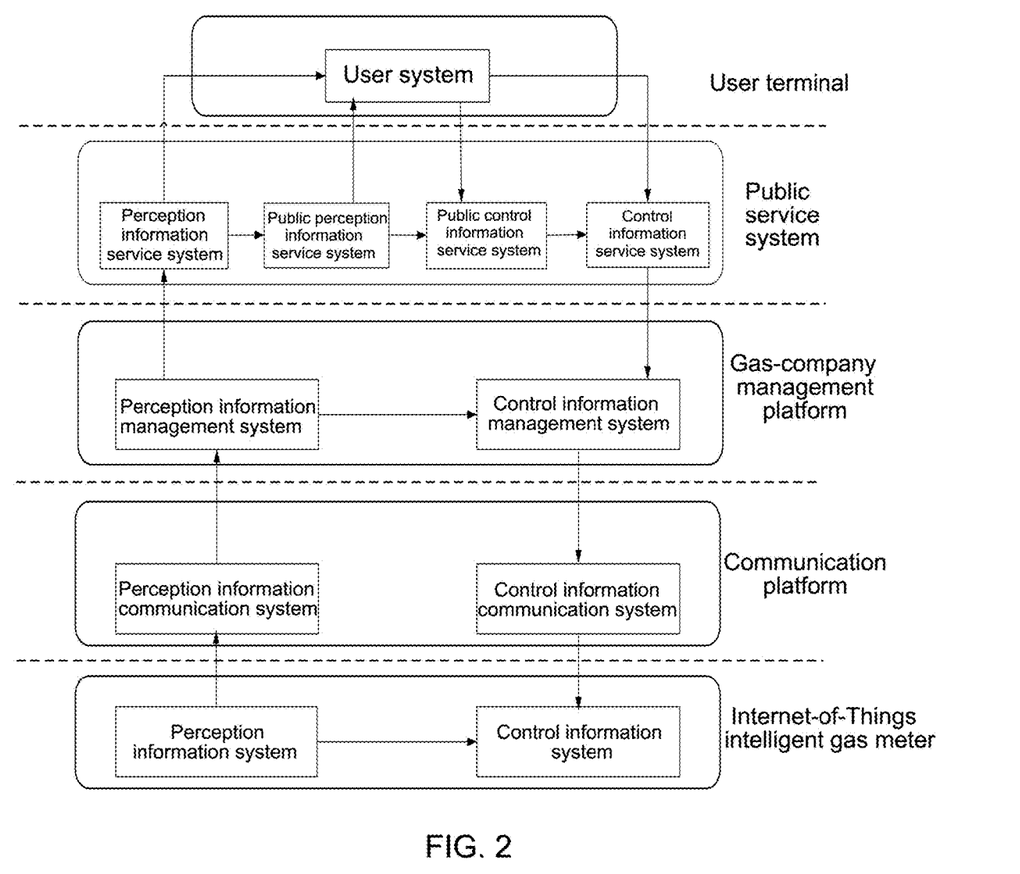
FIG. 2 is a schematic diagram showing information transmission of an Internet-of-Things system for an intelligent gas meter according to an embodiment of the present disclosure.

FIG. 2 is a schematic diagram showing information transmission of the Internet-of-Things system for an intelligent gas meter according to an embodiment of the present disclosure. As shown in FIG. 1 or 2, the Internet-of-Things system for an intelligent gas meter further includes a public service system. The public service system establishes communication with the gas-company comprehensive gas management system through a public network. The public service system includes a public perception information service system, a public control information service system and a gas-company information service system.

Figure 3:
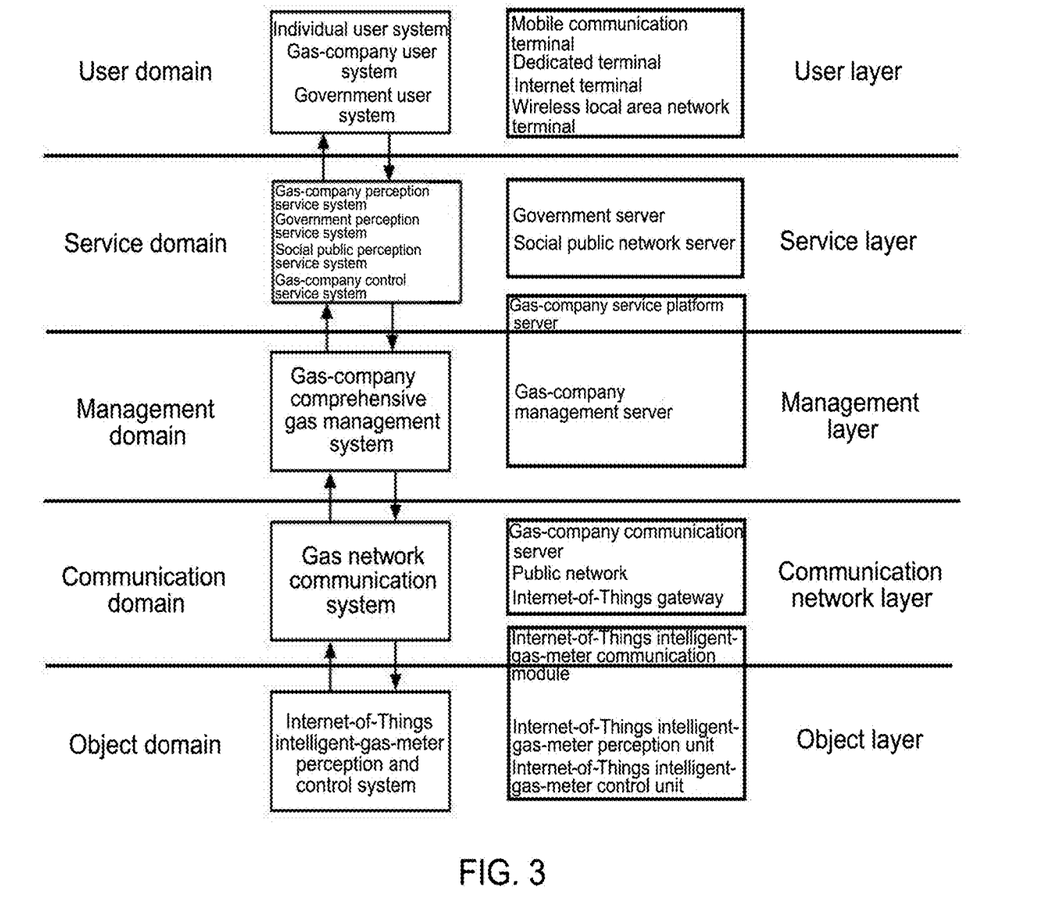
FIG. 3 is a structural diagram of an Internet-of-Things system for an intelligent gas meter according to another embodiment of the present disclosure.
Figure 4:
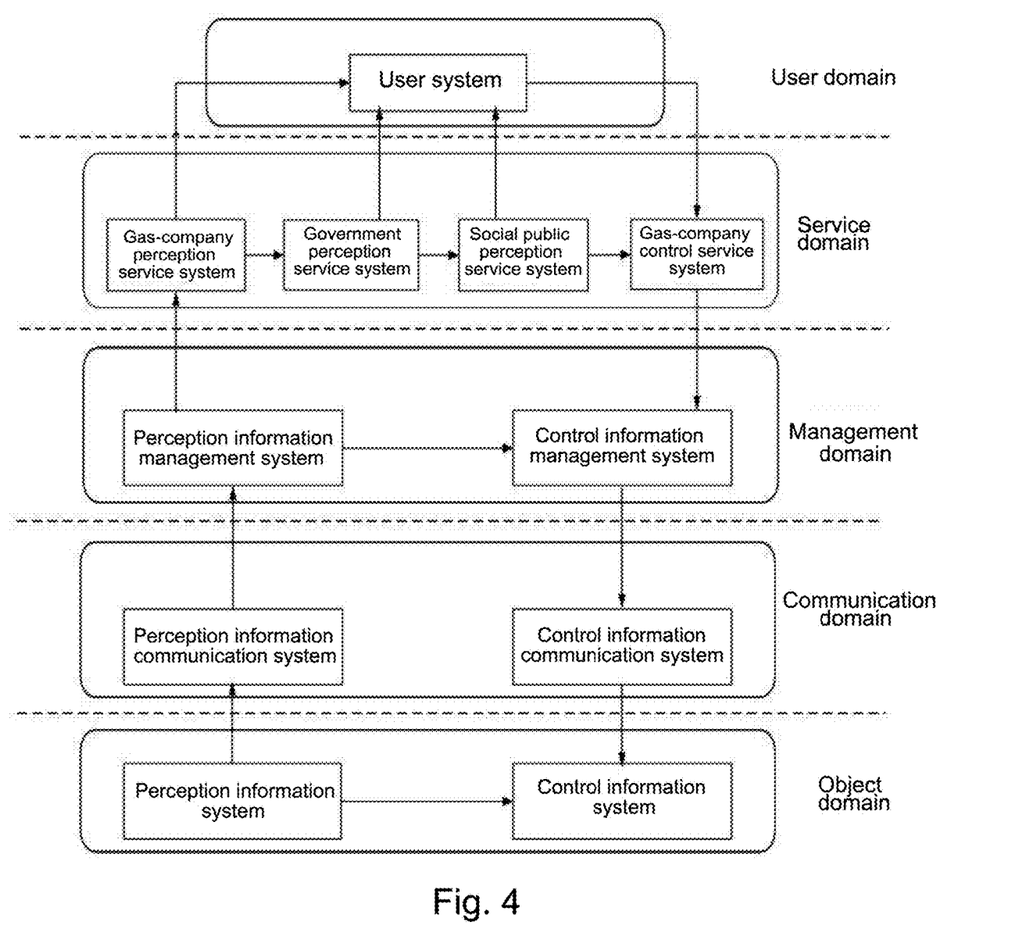
FIG. 4 is a schematic diagram showing information transmission of an Internet-of-Things system for an intelligent gas meter according to another embodiment of the present disclosure.

FIG. 3 is a structural diagram of an Internet-of-Things system for an intelligent gas meter according to another embodiment of the present disclosure. FIG. 4 is a schematic diagram showing information transmission of an Internet-of-Things system for an intelligent gas meter according to another embodiment of the present disclosure.

FIG. 3 is substantially similar to FIG. 1, except that "public service system (public service network facility)" and "gas company management facility" as well as "communication network facility" in the Internet-of-Things system for an intelligent gas meter shown in FIG. 1 have been amended correspondingly, and some terms are slightly adjusted in expression. For example, the information system of the Internet-of-Things system is divided into "object domain", "communication domain", "management domain", "service domain" and "user domain", and the physical system is divided into "object layer", "communication network layer", "management layer", "service layer" and "user layer". It should be understood that similar terms used herein may be interpreted broadly based on what is disclosed in the priority application CN 201510796810.7 of the present application without hindering understanding of the present disclosure, unless otherwise specified.

Alternatively, the Internet-of-Things system for an intelligent gas meter may also include a service system (for example, a service domain in the information system shown in FIG. 3). The service system establishes communication with the gas-company comprehensive gas management system through a public network. The service system includes a gas-company perception service system, a gas-company control service system, a government perception service system, and a social public perception service system. The service domain or service layer may also include other information systems, and said other information systems may be other Internet-of-things systems or other non-Internet-of-things systems, for example, any individual, computer, or other electronic device that can provide information source or information service.

The Internet-of-Things intelligent-gas-meter perception and control system may be provided on an Internet-of-Things intelligent gas meter. The Internet-of-Things intelligent-gas-meter perception unit and the Internet-of-Things intelligent-gas-meter control unit included in the Internetof-Things intelligent-gas-meter perception and control system may both belong to parts of the Internet-of-Things intelligent gas meter.

The Internet-of-Things intelligent gas meter is also provided with an Internet-of-Things intelligent-gas-meter communication module. The Internet-of-Things intelligent-gas-meter communication module forms a communication platform together with a mobile communication network and an Internet-of-Things gateway. The sub-systems of the gas network communication system, i.e., the perception information communication system and the control information communication system as shown in FIG. 2 or 4, both are located on the Internet-of-Things intelligent-gas-meter communication module. The mobile communication network and the Internet-of-Things gateway constitute the communication network facility of the Internet-of-Things intelligent gas meter. The gas network communication system is in charge of uploading the perception information of the intelligent gas meter to the gas company in a wirelessly manner.

The gas-company comprehensive gas management system belongs to a system on the gas-company management facility. The corresponding hardware facilities of the gas-company management facility include a communication server, an application server, and a management server. The sub-systems of the gas-company comprehensive gas management system, i.e., the perception information management system and the control information management system as shown in FIG. 2 or 4, both are provided on the management server to implement the management and control of the intelligent gas meter. The communication server is configured to communicate with the outside. The application server is configured to perform information interaction with the public network. The management server and the communication server may constitute a gas-company management platform. The communication server achieves an interface with the mobile communication network, for modulating and demodulating signal(s) of the mobile communication network, uploading the collected information of the intelligent gas meter, or issuing the control information in a remote manner. The communication server is in charge of the conversion between a protocol specifically used in the sensing fields and an Internet IP protocol.

The public service network facilities corresponding to the service system include a data server (DB), a public management server (MG) and an application server (CS). The public service network facility and the gas-company management facility may share one application server, and may also adopt corresponding application servers respectively. The data server is configured to perform management on the perception information, such as processing, sharing, storing, identifying and parsing the perception information and the like. The public perception information service system and the public control information service system are both provided in the public management server. The gas-company information service system is provided in the application server. The application server (CS) is configured to classify and screen information of the upper and lower layers.

The Internet-of-Things system for the intelligent gas meter further includes a user terminal, i.e., a gas user terminal (or a user domain as shown in FIG. 3). The user system of the user terminal may be classified into an individual user system, a gas-company user system, and a government user system. The user terminal includes at least one or more of a mobile communication terminal, a dedicated terminal, an Internet terminal, and a wireless local area network terminal. The access of individual user may be achieved in various ways, among others, APP software may be used as an access entry, or an Internet web page may also be used as an access entry. The access of a gas company user, different from the access of the individual user, shall employ a local area network's unified exit as an access entry. The government user terminal may access directly to the public network or access through local area network, meeting the requirements of the protocol of the public network.

Embodiment 1

Referring to FIGS. 1-4 of the description, in an exemplary embodiment of an information transmission method for an Internet-of-Things system for an intelligent gas meter of the present disclosure, the information transmission method includes: establishing communication between the intelligent-gas-meter perception unit and the intelligent-gas-meter control unit of the intelligent-gas-meter perception and control system; the intelligent-gas-meter perception unit perceiving perception information of the intelligent gas meter, and then transmitting the perception information to the intelligent-gas-meter control unit; and the intelligent-gas-meter control unit converting the perception information into control information, and implementing automatic processing of and response to the intelligent gas meter.

Embodiment 2

In another embodiment of the information transmission method for the Internet-of-Things system for an intelligent gas meter according to the present disclosure, the information transmission method further includes: the intelligent-gas-meter perception unit of the intelligent-gas-meter perception and control system acquiring the perception information of the intelligent gas meter, and transmitting the perception information to the perception information management system in the gas-company comprehensive gas management system through the perception information communication system in the gas network communication system; transmitting, after the perception information management system processes the received information by storing, identifying and parsing and so on, transmitting the processed perception information to the control information management system, and the control information management system generating control information based on the perception information or converting the acquired perception information into corresponding control information, and processing the control information by storing, identifying and parsing and so on, and then transmitting the processed control information to the intelligent-gas-meter control unit of the intelligent-gas-meter perception and control system through the control information communication system in the gas network communication system, and the intelligent-gas-meter control unit implementing control of the intelligence gas meter based on the received control information.

Embodiment 3

In still another embodiment of the information transmission method for the Internet-of-Things system for an intelligent gas meter according to the present disclosure, the information transmission method further includes: the intelligent-gas-meter perception unit of the intelligent-gas-meter perception and control system acquiring the perception information of the intelligent gas meter and transmitting the perception information to the perception information management system in the gas-company comprehensive gas management system through the perception information communication system in the gas network communication system; transmitting, after the perception information management system processes the received perception information by storing, identifying and parsing and so on, the processed perception information to the gas-company perception service system in the service system through the public network; the perception service system processing the acquired perception information by storing, identifying and parsing, and then transmitting the processed perception information to the user system of the user terminal; the user system generating control information based on the perception information or converting the received perception information into control information, and then processing the control information by storing, identifying and parsing and so on, and transmitting the processed control information to the gas-company control service system; the control service system transmitting the received control information to the control information management system in the gas-company comprehensive gas management system through the public network, and transmitting, after the control information management system processes the received control information by storing, identifying and parsing and so on, the control information to the intelligent-gas-meter control unit in the intelligent-gas-meter perception and control system through the control information communication system in the gas network communication system; and the intelligent-gas-meter control unit implementing control of the intelligent gas meter based on the received control information.

Preferably, the gas-company information service system processes the received perception information by storing, identifying and parsing and so on in the application server, and then stores the perception information in the data server; and the control information service system processes the received perception information by storing, identifying and parsing and so on also in the application server, and stores the control information in the data server.

Embodiment 4

In still another embodiment of the present disclosure, the government perception service system and/or social public perception service system in the service system acquires the public perception information of the intelligent gas meter through the public network, and transmits the public perception information to the user system of the user terminal.

Preferably, the user system may store, identify, and parse the received perception information, and transmits the public perception information directly to a gas-company control service system in the service system. The gas-company control service system generates control information based on the public perception information or converts the received public perception information into corresponding control information, then processes the control information by storing, identifying and parsing, and transmits the processed control information to the control information management system in the gas-company comprehensive gas management system through the public network for summarization. The control information management system stores, identifies and parses the control information, and transmits the control information to the intelligent-gas-meter control unit of the intelligent-gas-meter perception and control system through the control information communication system in the gas network communication system. The intelligent-gas-meter control unit implements control of the intelligent gas meter based on the received information.

Or, alternatively, the user system may also store, identify, and parse public perception information, generates control information based on the public perception information, or converts the received public perception information into control information, and stores the control information, and then transmits the control information to the public control information service system in the public service system. The public control information service system transmits the control information to the control information service system in the gas company information service system. The gas-company control service system stores, identifies and parsing the control information, and transmits the processed control information to the control information management system in the gas-company comprehensive gas management system through the public network for summarization. The control information management system stores, identifies and parses the control information, and transmits the control information to the intelligent-gas-meter control unit of the intelligent-gas-meter perception and control system through the control information communication system in the gas network communication system. The intelligent-gas-meter control unit implements control of the intelligent gas meter based on the received information.

Embodiment 5

In still another embodiment of the present disclosure, the public perception information service system in the public service system acquires the public perception information of the intelligent gas meter through the public network, and transmits the public perception information to the public control information service system in the public service system. The public control information service system transmits the public perception information to the control information service system in the gas-company information service system. The control information service system generates control information based on the public perception information or converts the received public perception information into corresponding control information, and then stores, identifies, and parses the control information, and then transmits the processed control information to the control information management system in the gas-company comprehensive gas management system through the public network. The control information management system stores, identifies and parses the control information, and transmits the control information to the intelligent-gas-meter control unit of the intelligent-gas-meter perception and control system through the control information communication system in the gas network communication system. The intelligent-gas-meter control unit implements control of the intelligent gas meter based on the received information.

Preferably, the public perception information service system in the public service system acquires public perception information of the intelligent gas meter through the public network, and transmits the public perception information to the public control information service system in the public service system. The public control information service system transmits the public perception information to the control information service system in the gas-company information service system. The control information service system stores, identifies, and parses the received public perception information, and transmits the processed public perception information to the control information management system in the gas-company comprehensive gas management system through the public network. The control information management system generates control information based on public perception information or converts the received public perception information into corresponding control information, and then stores, identifies, and parses the control information, and transmits the control information to the intelligent-gas-meter control unit of the intelligent-gas-meter perception and control system through the control information communication system in the gas network communication system. The intelligent-gas-meter control unit implements control of the intelligent gas meter based on the received information.

The above embodiments are preferred embodiments of the present disclosure, but the embodiment of the present disclosure is not limited by the above embodiments, and any other changes, modifications, substitutions, combinations, and simplification made without departing from the spirit and principle of the present disclosure shall all be equivalent replacements, and shall all be included in the protection scope of the present disclosure.

The invention claimed is:

1. An Internet-of-Things system for a smart gas meter, comprising:
    an intelligent-gas-meter comprising:
        an intelligent-gas-meter perception system with an intelligence-gas-meter perception unit that perceives perception information of an intelligent gas meter, and
        an intelligent-gas-meter control system with an intelligent-gas-meter control unit;
    a gas network communication system comprising a perception information communication system and a control information communication system;
    a gas-company comprehensive gas management system comprising a perception information management system and a control information management system;
    a perception transmission line, wherein perception information is communicated along said perception transmission line from the intelligent-gas-meter perception system to the perception information communication system and to the perception information management system,
        wherein perception information is converted into control information when the perception information is communicated from the perception information management system to the control information management system; and
    a control transmission line, wherein control information is communicated along said control transmission line from the control information management system to the control information communication system and to the intelligent-gas-meter control system,
    wherein the perception transmission line and the control transmission line are separated to void mutual interference between the perception information and control information; and
    a service system,
        wherein the service system is configured to establish communication with the gas-company comprehensive gas management system through a public network; and the service system comprises a gas-company perception service system, a gas-company control service system, a government perception service system and social public perception service system, wherein the government perception service system acquires public perception information through the public network, and wherein the gas company control service system generates control information based on the public perception information and processes the control information by identifying, parsing, and transmitting the control information to the control information management system of the gas-company comprehensive gas management system to enable resources to be effectively utilized.

2. The Internet-of-Things system for an intelligent gas meter according to claim 1, further comprising a user terminal, wherein the user terminal comprises a user system.

3. The Internet-of-Things system for an intelligent gas meter according to claim 1, wherein communication is established between the intelligent-gas-meter perception unit and intelligent-gas-meter control unit of the intelligent-gas-meter perception system and the intelligent-gas-meter control system; the intelligent-gas-meter perception unit is configured to perceive perception information of the intelligent gas meter and then transmit the perception information to the intelligent-gas-meter control unit; and the intelligent-gas-meter control unit is configured to convert the perception information into control information, and implement automatic processing of and response to the intelligent gas meter.

4. The Internet-of-Things system for an intelligent gas meter according to claim 1, wherein the intelligent-gas-meter perception unit of the intelligent-gas-meter perception system is configured to acquire perception information of the intelligent gas meter and transmit the perception information through the perception transmission line to the perception information management system in the gas-company comprehensive gas management system; the perception information management system is configured to transmit the perception information to the control information management system, the control information management system is configured to transmit control information to the intelligent-gas-meter control unit through the control transmission line; and the intelligent gas meter control unit is configured to implement control of the intelligent gas meter based on the received information.

5. The Internet-of-Things system for an intelligent gas meter according to claim 2, wherein the intelligent-gas-meter perception unit of the intelligent-gas-meter perception system is configured to acquire perception information of the intelligent gas meter and transmit the perception information to the perception information management system in the gas-company comprehensive gas management system through the perception information communication system in the gas network communication system; the perception information management system is configured to transmit the perception information to the gas-company perception service system in the service system through the public network; the gas-company perception service system is configured to transmit the perception information to the user system of the user terminal; the user system is configured to transmit the perception in formation to the gas-company control service system, and convert the perception information into the control information; the gas-company control service system is configured to transmit the control information through the public network to the control information management system in the gas-company comprehensive gas management system; the control information management system is configured to transmit the control information to the intelligent-gas-meter control unit in the intelligent-gas-meter control system through the control information communication system in the gas network communication system; and the intelligent-gas-meter control system through the control information communication system in the gas network communication system; and the intelligent-gas-meter control unit is configured to implement control of the intelligent gas meter based on the received control information.

6. The Internet-of-Things system for an intelligent gas meter according to claim 3, wherein the control information is generated based on the perception information or obtained by converting the perception information, in a process where the intelligent-gas-meter perception unit transmits perception information to the intelligent-gas-meter control unit.

7. The Internet-of-Things system for an intelligent gas meter according to claim 2, wherein the government perception service system and/or the social public perception service system in the service system is configured to acquire public information of the intelligent gas meter through the public network, and transmit the public information to the user system of the user terminal; the user system is configured to transmit the public information to the gas-company control service system in the service system; the gas-company control service system is configured to transmit the public information through the public network to the control information management system in the gas-company comprehensive gas management system; the control information management system is configured to transmit the control information to the intelligent-gas-meter control unit in the intelligent-gas-meter control system through the control information communication system in the gas network communication system; and the intelligent-gas-meter control unit is configured to implement control of the intelligent gas meter based on the received control information.

8. The Internet-of-things system for an intelligent as meter according to claim 7, wherein the public information comprises public perception information and control information, and the control information is generated based on the public perception information or obtained by converting the public perception information.

9. The Internet-of-Things system for an intelligent gas meter according to claim 3, wherein control information is generated based on the perception information or obtained by converting the perception information, in a process where the intelligent-gas-meter perception unit transmits information to the intelligent-gas-meter control unit.

10. The Internet-of-Things system for an intelligent gas meter according to claim 5, wherein the control information is generated based on the perception information or obtained by converting the perception information.

11. The Internet-of-Things system for an intelligent gas meter according to claim 1, wherein the perception transmission line and the control transmission line comprise a plurality of nodes that increase security of the Internet-of-Things system.

12. An information transmission method for an Internet-of-Things system for an intelligent gas meter, wherein the Internet-of-Things system for the intelligent gas meter comprises an intelligent gas meter comprising an intelligent-gas-meter perception system and an intelligent-gas-meter control system, a gas network communication system comprising a perception information communication system and a control information communication system, and a gas-company comprehensive gas management system comprising a perception information management system and a control information management system, wherein the intelligent-gas-meter perception system and the intelligent-gas-meter control system respectively comprise an intelligent-gas-meter perception unit and an intelligent-gas-meter control unit, wherein the information transmission method comprises:

establishing a perception transmission line that communicates perception information from the intelligent-gas-meter perception system to the perception information communication system and to the perception information management system, wherein the perception information management system is configured to communicate the perception information to the control information management system, the control information management system being configured to convert perception information into control information:

establishing a control transmission line that communicates control information from the control information management system to the control information communication system and to the intelligent-gas-meter control system;

the intelligent-gas-meter perception unit perceiving perception information of the intelligent gas meter and transmitting the perception information to the perception information management system;

the perception information management system communicating the perception information to the control information management system through the perception transmission line;

the control information management system generating control information based on the perception information;

the control information management system communicating the control information to the intelligent-gas-meter control system through the control transmission line;

the intelligent-gas-meter control unit implementing control of the intelligent gas meter based on the received control information; and the government perception service system in the service system acquiring public information of the intelligent gas meter through the public network, and transmitting the public information to the user system of the user terminal; the user system transmitting the public information to the gas-company control service system in the service system; the gas-company control service system transmitting the public information to the gas-company control service system in the service system; the gas-company control service system transmitting the public information to the control information management system in the gas-company comprehensive gas management system through the public network; the control information management system transmitting the control information to the intelligent-gas-meter control unit through the control information communication system in the gas network communication system; and the intelligent-gas-meter control unit implementing control of the intelligent gas meter based on the received control information.

13. The information transmission method according to claim 12 further comprising:

transmitting, after the intelligent-gas-meter perception unit perceives the perception information of the intelligent gas meter, the perception information to the perception information management system in the gas-company comprehensive gas management system through the perception information communication system in the gas network communication system;

the perception information management system transmitting the perception information to a gas-company perception service system in a service system through a public network, and the gas-company perception service system transmitting the perception information to a user system of a user terminal;

the user system transmitting the perception information to a gas-company control service system, and the gas-company control service system transmitting the control information to the control information management system in the gas-company comprehensive gas management system through the public network;

the control information management system transmitting control information to the intelligent-gas-meter control unit through the control information communication system in the gas network communication system; and the intelligent-gas-meter control unit implementing control of the intelligent gas meter based on the received control information.

14. The information transmission method according to claim 12, wherein the control information is generated based on the perception information or the perception information is converted into the control information.

15. The information transmission method according to claim 12, further comprising:

transmitting, after the intelligent-gas-meter perception unit perceives the perception information of the intelligent gas meter, the perception information to the perception information management system in the gas-company comprehensive gas management system through the perception information communication system in the gas network communication system;

the perception information management system transmitting the perception information to a gas-company perception service system in a service system through a public network, and the gas-company perception service system transmitting the perception information to a user system of a user terminal;

the user system transmitting the perception information to a gas-company control service system, and the gas-company control service system transmitting the control information to the control information management system in the gas-company comprehensive gas management system through the public network;

the control information management system transmitting control information to the intelligent-gas-meter control unit through the control information communication system in the gas network communication system; and the intelligent-gas-meter control unit implementing control of the intelligent gas meter based on the received control information.

16. The information transmission method according to claim 12, further comprising:

establishing communication between the intelligent-gas-meter perception unit and the intelligent-gas-meter control unit;

the intelligent-gas-meter perception unit perceiving information of the intelligent gas meter, and transmitting the perception information to the intelligent-gas-meter control unit; and the intelligent-gas-meter control unit generating control information based on the perception information or converting the perception information into control information and implementing automatic processing of the response to the intelligent gas meter.

17. An Internet-of-Things system for a smart gas meter, comprising:

an intelligent-gas-meter comprising:

an intelligent-gas-meter perception system with an intelligence-gas-meter perception unit that perceives perception information of an intelligent gas meter, and an intelligent-gas-meter control system with an intelligent-gas-meter control unit;

a gas network communication system comprising a perception information communication system and a control information communication system;

a gas-company comprehensive gas management system comprising a perception information management system and a control information management system;

a perception transmission line, wherein perception information is communicated along said perception transmission line from the intelligent-gas-meter perception system to the perception information communication system and to the perception information management system, wherein perception information is converted into control information when the perception information is communicated from the perception information management system to the control information management system; and a control transmission line, wherein control information is communicated along said control transmission line from the control information management system to the control information communication system and to the intelligent-gas-meter control system, wherein the perception transmission line and the control transmission line are separated to void mutual interference between the perception information and control information; and a service system, wherein the service system is configured to establish communication with the gas-company comprehensive gas management system through a public network; and the service system comprises a gas-company perception service system, a gas-company control service system, a government perception service system and social public perception service system, wherein the social public perception service system acquires public perception information through the public network, and wherein the gas company control service system generates control information based on the public perception information and processes the control information by identifying, parsing, and transmitting the control information to the control information management system of the gas-company comprehensive gas management system to enable resources to be effectively utilized.

* * * * *